(12) United States Patent
Tanabe (10) Patent No.: US 6,334,006 B1
(45) Date of Patent: Dec. 25, 2001

(54) LOADING DEVICE AND ELECTRONIC EQUIPMENT SYSTEM

(75) Inventor: Ken Tanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/200,931

(22) Filed: Nov. 30, 1998

(30) Foreign Application Priority Data

Jun. 29, 1998 (JP) .................................................. 10-181821

(51) Int. Cl.$^7$ ....................................................... G02B 6/00
(52) U.S. Cl. .............................. 385/12; 385/14; 385/31; 385/135
(58) Field of Search ................................. 385/12, 14, 31, 385/134, 135, 136

(56) References Cited

U.S. PATENT DOCUMENTS

| 5,090,792 | * | 2/1992 | Koht et al. | ............................. 385/32 |
|---|---|---|---|---|
| 5,129,030 | * | 7/1992 | Petrunia | ................................ 385/135 |
| 5,265,187 | * | 11/1993 | Morin et al. | ......................... 385/135 |
| 5,448,675 | * | 9/1995 | Leone et al. | ......................... 385/135 |
| 5,461,693 | * | 10/1995 | Pimpinella | ........................... 385/135 |
| 5,724,468 | * | 3/1998 | Leone et al. | ......................... 385/134 |
| 5,966,492 | * | 10/1999 | Bechamps et al. | .................. 385/135 |
| 6,101,299 | * | 8/2000 | Laor | ....................................... 385/16 |
| 6,132,104 | * | 10/2000 | Bliss et al. | ............................. 385/53 |

FOREIGN PATENT DOCUMENTS 59180204   12/1984   (JP) .

* cited by examiner

*Primary Examiner*—John D. Lee
*Assistant Examiner*—Jennifer Doan
(74) *Attorney, Agent, or Firm*—Leydig, Voit, & Mayer, Ltd.

(57) ABSTRACT

An electronic equipment system includes an electronic device, a loading device for loading into and unloading from the electronic device, a light emitting section in the electronic device corresponding to the loading device, and an optical fiber corresponding to the loading device. The optical fiber transmits light from the light emitting section from a first end to a second end of the optical fiber.

12 Claims, 8 Drawing Sheets

LOADING DEVICE AND ELECTRONIC EQUIPMENT SYSTEM

BACKGROUND OF THE INVENTION

1. Field of the Invention

This invention relates to a loading and unloading device (hereinafter referred to merely as "loading device", when applicable), and an electronic equipment system, and more particularly to a loading device, and an electronic equipment system with which the user can recognize the access or non-access to a hard disk device inserted into an electronic device or the error thereof from the display of a light emitting section which is provided in correspondence to the hard disk device.

2. Description of the Related Art

With respect to the loading of a tape cassette in an electronic device or the unloading of the tape cassette therefrom, for instance Japanese Utility Patent Application (OPI) No. Sho.59-180204 has proposed a tape cassette loading display device. The conventional tape cassette loading display device is designed as follows: The reflection of light at the side surface of the tape cassette is utilized. The light emitted in the electronic device is transmitted through an optical fiber to the side surface, so that the reflected light is transmitted outside through another optical fiber, thereby to disclose whether the tape cassette has been loaded.

Figure 7:
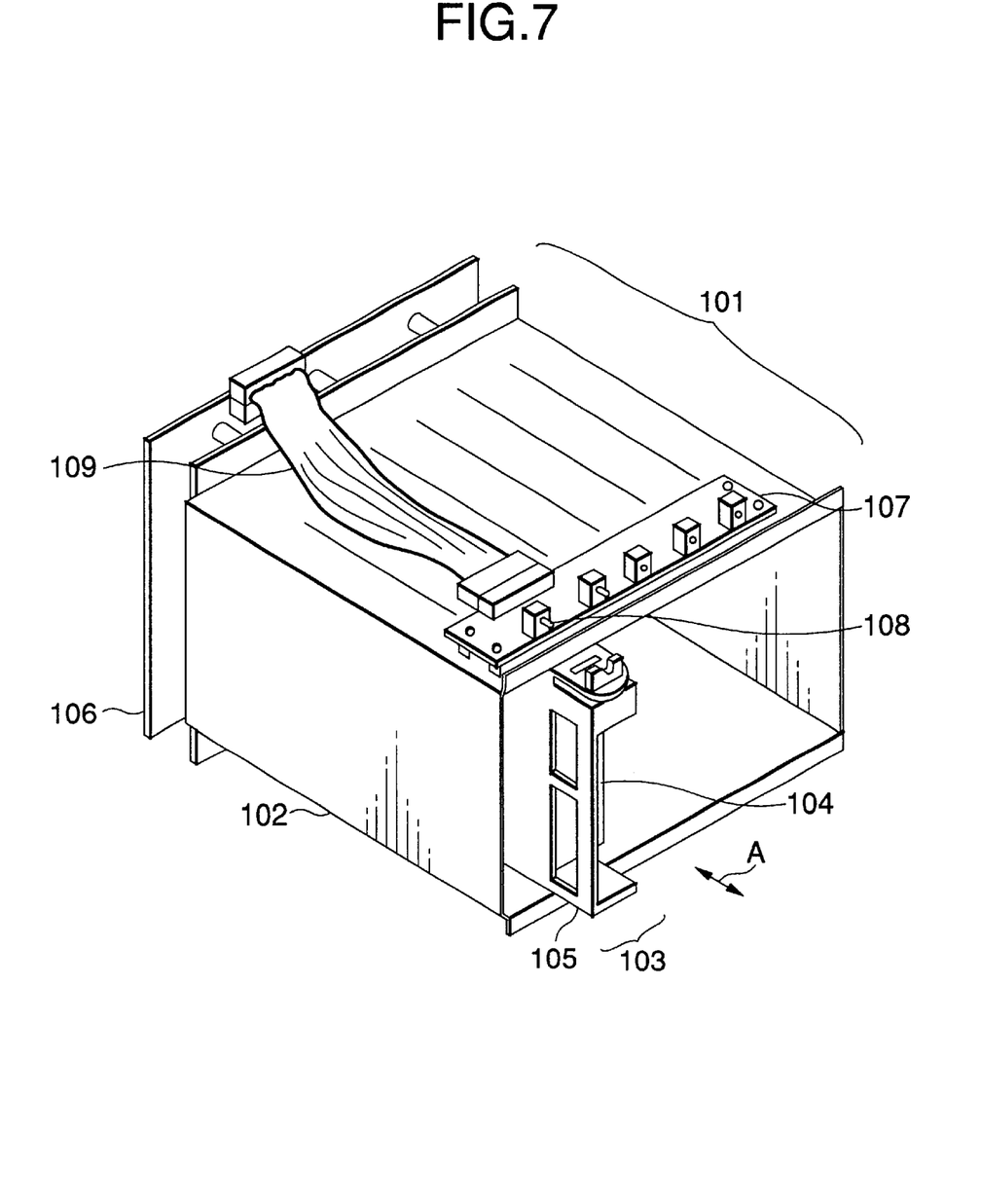
FIG. 7 is a perspective view showing the structure of a conventional electronic equipment system.

Now, a related art concerning the present invention will be described with reference to FIG. 7. FIG. 7 is a perspective view showing the structure of a conventional electronic equipment system. In FIG. 7, reference numeral 101 designates an electronic device used for a PC server or the like; 102, an accommodating chassis (hereinafter referred to merely as "a chassis", when applicable); and 103, a loading device which is moved in the directions of the arrow A so that it is inserted into the accommodating chassis 102 or removed from the latter. The device 103 has a hard disk tray 105 which accommodates a hard disk device 104.

Reference numeral 106 designates a back board which is provided on a backside of the accommodating chassis 102 and is connected through a connector or the like to an electrical connecting section (not shown) of the hard disk device 104; 107, a display board secured to the upper portion of the front side of the accommodating chassis 102 with screws or the like; and 108, light emitting sections such as LEDs which are provided on the display board 107 in correspondence to the hard disk devices 104 inserted in the accommodating chassis 102. Accordingly, the light emitting sections 108 correspond the hard disk devices 104 which are inserted right below the light emitting sections 108.

Reference numeral 109 designates a connecting cable which connects the back board 106 to the display board 107 through a connector or the like. The light emitting sections 108 mounted on the display board 107 operate as follows: When the hard disk device 104 inserted in the accommodating chassis 102 is accessed, or when an error occurs with the hard disk device 104, the light emitting sections 108 emit light in response to a signal from the back board 106.

With the above-described electronic equipment system, the user can recognize from the display state of the light emitting sections 108 whether the hard disk device 104 is accessed or whether an error occurs with the hard disk device.

Figure 8:
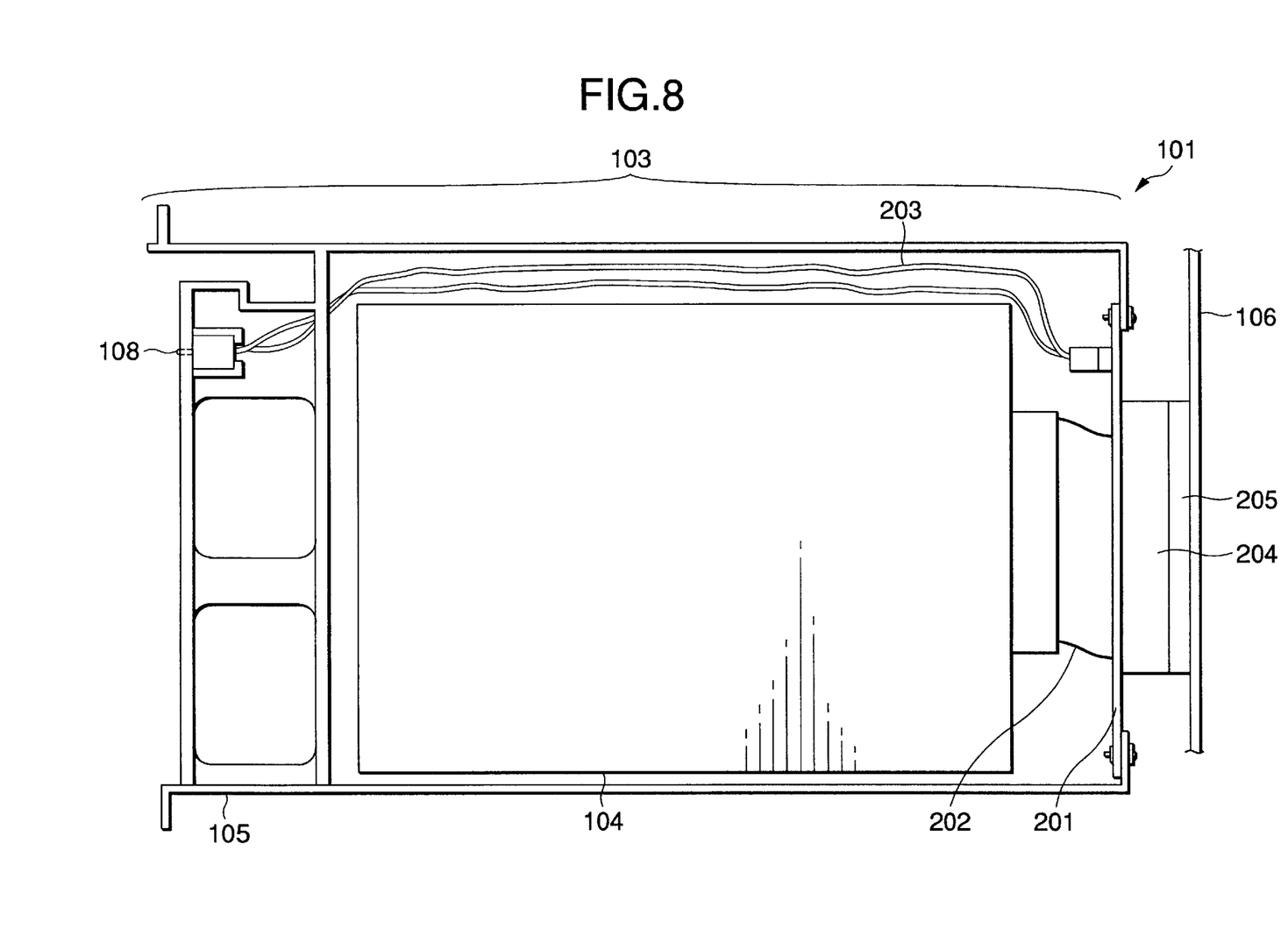
FIG. 8 is a sectional side view showing the structure of another conventional electronic equipment system.

FIG. 8 is a sectional side view showing the construction of another example of the conventional electronic equipment system. In FIG. 8, parts corresponding functionally to those already described with reference to FIG. 7 are therefore designated by the same reference numerals or characters. In FIG. 8, reference numeral 201 designates a relay board which is provided on the side of the back board 106, and secured to the hard disk tray 105 with screws; 202, a connecting cable which electrically connects the relay board 201 to the hard disk device 104; and 203, connecting cables which electrically connect the light emitting sections 108 on the front surface of the hard disk tray 105 to the relay board 201.

The connecting cables 203 of the light emitting sections 108 are provided in the space between the upper surface of the hard disk device 104 accommodated in the hard disk tray 105 and the upper board of the hard disk tray 105. Reference numeral 204 designates a connector which electrically connects the relay board 201 to the back board 106; and 205, a connector which electrically connects the back board 106 to the relay board 201. The connector 204 of the relay board 201 is electrically connected to the connector 205 of the back board 106.

The hard disk device 104 is electrically connected to the back board 106 through the connecting cable 202, the relay board 201, and the connectors 204 and 205. The light emitting sections 108 are electrically connected to the back board 106 through the connecting cables 203, the relay board 201, and the connectors 204 and 205.

In the conventional electronic equipment system, the light emitting sections 108 are directly fitted in the hard disk tray 105 or bonded thereto, and are electrically connected to the back board 106 through the connecting cables 203 set in the hard disk tray 105, and the relay board 201 coupled to the hard disk tray 105. Therefore, in this case, the space in the direction of height on the accommodating chassis is smaller than in the conventional case where, as shown in FIG. 7, the display board 107, the light emitting sections 108, and the connecting cables are arranged on the accommodating chassis 102.

In the conventional electronic equipment system as shown in FIG. 7, the display board 107 is provided on the upper portion of the front surface of the chassis 102, and the light emitting sections 108 are so provided that they correspond to the hard disk devices 104, and the back board 106 and the display board 107 are so arranged on the chassis 102 that the back board 106 is electrically connected to the display board 107 through the connector and the connecting cable 109. Therefore, the space in the direction of height on the accommodating chassis 102 in the electronic device 101 is increased as much as the display board 107, and the light emitting sections 108 and the connecting cable 109 are provided on the chassis 102. Hence, it is rather difficult to make the electronic device 101 compact in arrangement.

Furthermore, in the conventional electronic equipment system shown in FIG. 7, in order that the light emitting sections 107 are located on the front part of the upper surface of the chassis 102, the display board 107 and the connecting cable 109 are employed. Hence, it is intricate in structure, and is much increased in manufacturing cost.

In the conventional electronic equipment system shown in FIG. 8, in order that the light emitting sections 108 and the hard disk device 104 are electrically connected to the back board 106, the relay board 201 is secured to the hard disk tray 105 with screws. Hence, it is intricate in structure, and is increased in manufacturing cost as much.

SUMMARY OF THE INVENTION

Accordingly, to eliminate the above-described difficulties, It is an object of the present invention to provide a loading device and an electronic equipment system in which the space in the direction of height on an accommodating chassis is reduced to make the device compact, and the structure is simplified thereby to decrease the manufacturing cost of the device.

The present invention provides a loading device which is loaded in an electronic device and unloaded from the electronic device, including an optical fiber transmitting a light beam applied at one end thereof to the other end thereof.

The present invention also provides an electronic equipment system including an electronic device, a loading device loaded in the electronic device and unloaded therefrom, a light emitting section provided in the electronic device in correspondence to the loading device, and an optical fiber provided in correspondence to the loading device and transmitting a light beam of the light emitting section applied at one end thereof to the other end thereof.

DETAILED DESCRIPTION OF THE PREFERRED EMBODIMENTS

Figure 1:
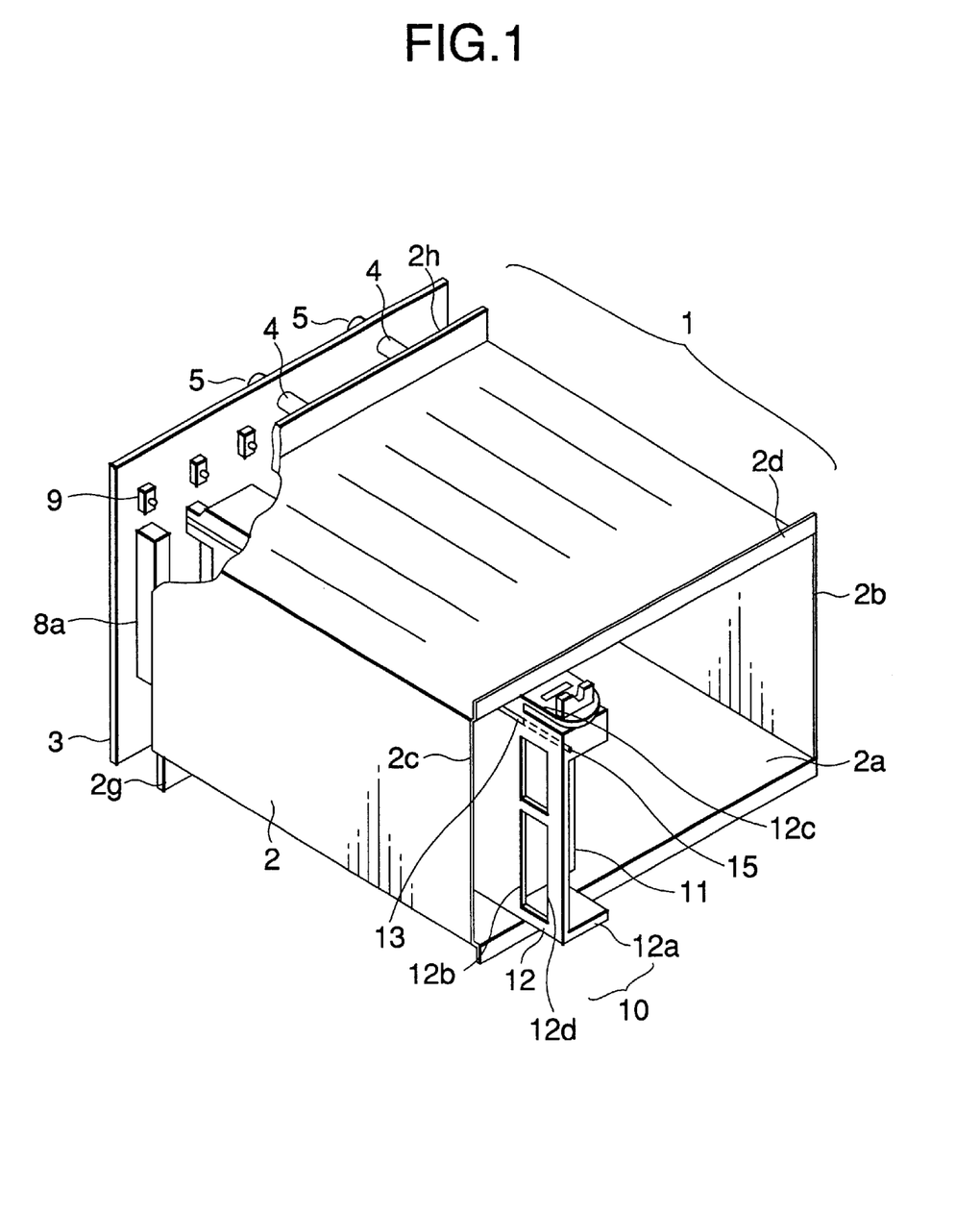
FIG. 1 is a perspective view showing the structure of an electric equipment system of an embodiment according to the invention.
Figure 2:
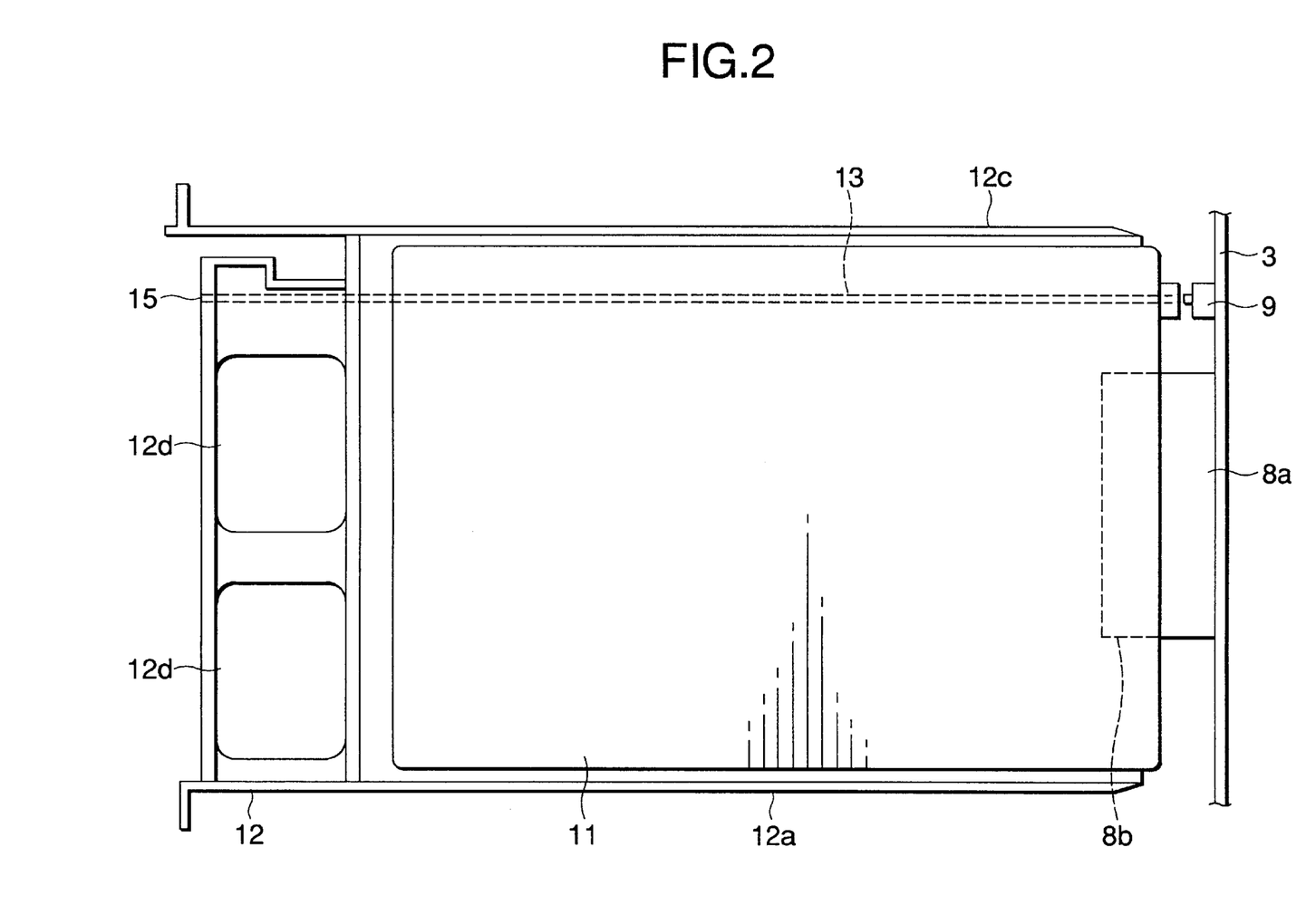
FIG. 2 is a sectional side view showing the structure of the electronic equipment system shown in FIG. 1.

FIG. 1 is a perspective view showing the structure of an example of an electronic equipment system which constitutes a first embodiment of the invention, and FIG. 2 is a sectional side view showing the structure of the electronic equipment system shown in FIG. 1.

The electronic equipment system mainly includes an electronic device, and a loading device for loading or unloading within the electronic device. The electronic device is used for a PC server, and is so designed that the user is able to detect a display light from outside the device.

In FIGS. 1 and 2, reference numeral 1 designates the electronic device which includes an accommodating chassis 2 (hereinafter referred to merely as "a chassis 2", when applicable), and a back board 3. The chassis 2 includes by a bottom wall 2a, side walls 2b and 2c, an upper wall 2d, rear walls 2g and 2h.

The chassis 2 has the rear wall 2g along the rear edge of the bottom wall 2a, and the rear wall 2h along the rear edge of the upper wall 2d. The back board 3 is secured to the chassis 2 by screws 5 through spacers 4 mounted on the rear walls 2g and 2h of the chassis 2.

The accommodating chassis 2 has guide sections (not shown) inside the bottom wall 2a and the top wall 2d to load the loading device 10 in the chassis or to unload the loading device 10 therefrom. That is, with the aid of the guide sections provided on the bottom wall 2a and the top wall 2d, the loading device 10 can be loaded in the chassis 2 or unloaded it from the latter 2. Male connectors 8a, and light emitting sections 9 such as LEDs are provided inside the back board 3.

The loading device 10 is loaded into the chassis 2 along the guide sections from the front of the chassis 2. The loading device 10 includes a hard disk device 11, a tray 12, and an optical fiber 13 about 2 mm in diameter. At the rear of the hard disk device 11, and inside the latter 11, a female connector 8b is provided which is electrically connected to the male connector 8a on the back board 3. The tray 12 of the loading device 10 has a bottom wall 12a, a side wall 12b, an upper wall 12, and a finger-hooking hole 12d for insertion or removal of the loading device.

Figure 3:
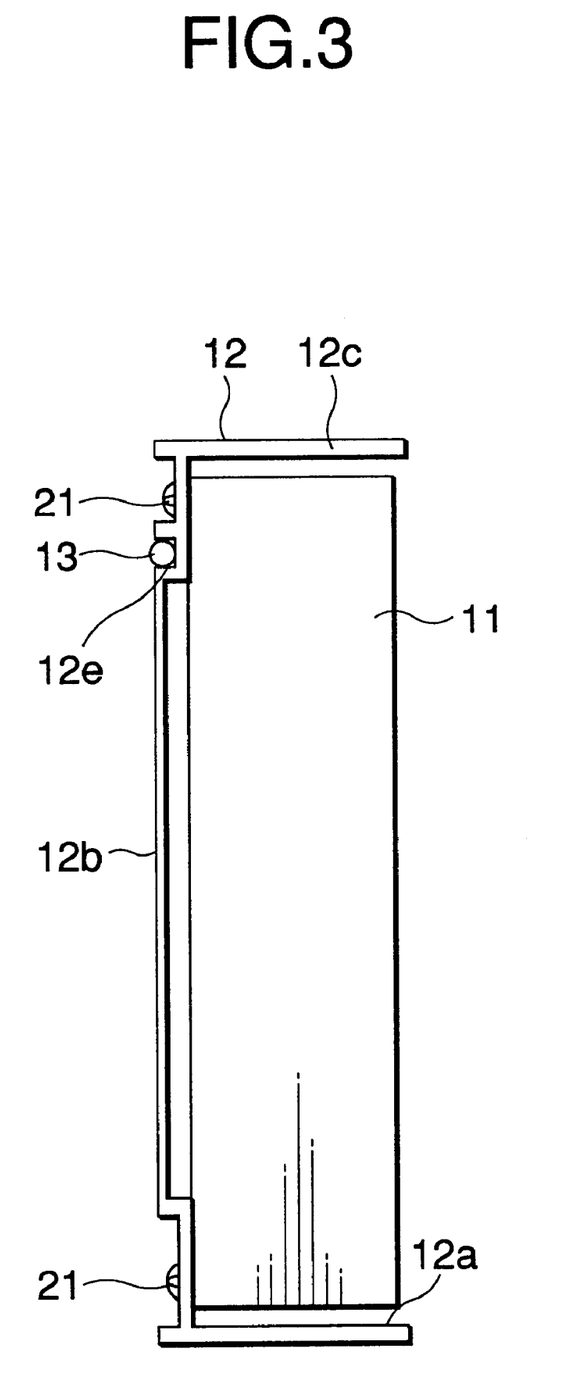
FIG. 3 is a sectional side view showing the structure of a tray of a loading device shown in FIG. 1.

FIG. 3 is a sectional side view of the tray of the loading device shown in FIG. 1. Inside the side wall 12b of the tray 12, the hard disk device 11 is arranged. The hard disk device 11 is secured to the side wall 12b with screws 21. The optical fiber 13 is arranged in such a manner that it is buried in an optical-fiber accommodating section 12e which is formed in the side wall 12b of the tray 12, and secured thereto with an adhesive agent. The optical fiber may be fixed, for instance, by forming a hook in the tray 12.

The optical fiber 13 is arranged as follows: Its front end face is substantially in parallel with the front surface of the tray 11 so that the user is able to observe the section of the optical fiber through an observing section 15 from front. The rear end face is so set that, when the loading device 10 is loaded in the chassis 2, the clearance between the rear end face and the light emitting section 9 on the back board 3 is of the order of from 0.5 mm to 2 mm.

In the embodiment, the design of the above clearance can apply the output light of the light emitting section 9 to the end face of the optical fiber 13 with high efficiency, and in addition the difficulty that the optical fiber 13 is brought into contact with the light emitting section 9 to damage the latter is eliminated. However, the embodiment may be so modified that the optical fiber 13 is kept in contact with the light emitting section 9 to prevent the damage of the latter 9.

The loading device 10 is loaded in the accommodating chassis 2 as follows: First, while holding the female connector 8b of the hard disk device 11 at the head, the bottom wall 12a and the upper wall 12b of the tray 12 of the loading device 10 are inserted in between the two guide sections lined on the bottom wall 2a and the top wall 2d of the chassis 2. Under this condition, the loading device 10 is pushed backwardly (towards the back board 3), as a result of which the female connector 8b of the hard disk device 11 mounted on the loading device 10 is engaged with the male connector 8a on the back board 3. Thus, the loading device 10 is loaded in the accommodating chassis 2, while the hard disk device 11 is electrically connected to the back board 3 through the female connector 8b and the male connector 8a.

In the electronic device 1 thus structured, a description will be given of a method of recognizing from outside the display light which is emitted by the light emitting section 9, for instance to indicate a state of the loading device 10.

For instance, when the hard disk device 11 of the loading device 10 accommodated in the chassis 2 is accessed, or an error occurs within the device 11, the light emitting section 9 mounted on the back board 3 emits light in response to a signal from the back board 3.

The output light of the light emitting section 9 is led from one end of the optical fiber 13 which is is buried in the tray accommodating section 12e of the tray 12 of the loading device 10. The light thus led is transmitted to the other end, namely, the observing section 15. With the recognizing section 15 on the front surface of the loading device 10, the user observes the state of display of the light emitted on the end face of the optical fiber 13, to detect whether or not the hard disk device 11 is accessed or whether or not an error occurs within the latter 11. The tray accommodating section 12e can be readily obtained by forming a groove in the tray 12.

When the observability of the output light of the observing section 15 of the optical fiber 13 is taken into account, it is preferable that the clearance in the loading or unloading direction of the loading device between the optical fiber 13 arranged in the loading device 10 and the light emitting section 9 arranged on the back board 3, is 0.5 to 2 mm.

In the embodiment, in the electronic device 1, the loading device 10 is provided in correspondence to the hard disk device 11, and the optical fiber 13 which transmits the output light of the light emitting section 9 from one end to the other end, is provided in the tray accommodating section 12e of the tray 12. Therefore, the light beam which the light emitting section 9 emits according to a state of the hard disk device 11 can be displayed with the aid of the optical fiber 13. Hence, in this case, when compared with the case where a display board is provided on the chassis 2 or the case where the light emitting section is provided on the front surface of the device, and connected to the back board through the connecting cable and the relay board, the space in the direction of height on the chassis 2 is reduced; that is, the device can be miniaturized as much. In addition, the structure is simplified, and manufacturing cost is accordingly reduced.

In the above-described embodiment, the loading device 10 is so designed that it has the tray 12 for the accommodation of the hard disk device 11. However, it may be modified that it has a tray which accommodates an electronic unit other than the hard disk device 11.

Figure 4:
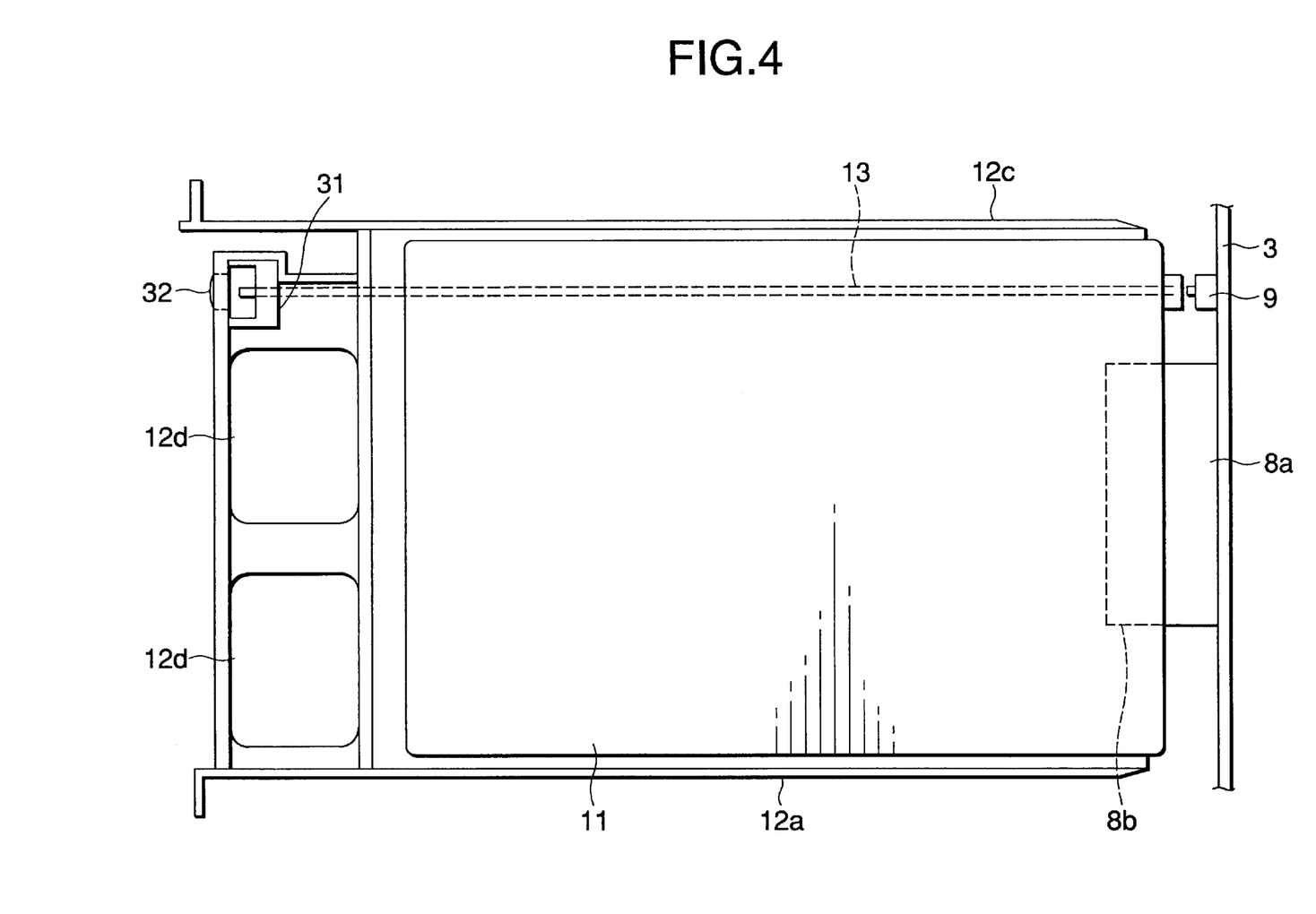
FIG. 4 is a sectional side view showing the structure of the tray of the loading device in which a lens is mounted on the observing section of the optical fiber in the invention.

In the above-described embodiment, although the light beam applied to one end of the optical fiber 13 is emitted from the end face of the other end of the latter, as shown in FIG. 4, a lens 32 fixed in a lens mounting section 31 which is a part of the tray 12 may be arranged on the other end of the optical fiber 13 through which the output light is emitted. In this case, the observability of the eye is improved when compared with the case where the end face of the optical fiber is directly observed without the lens 32.

Figure 5:
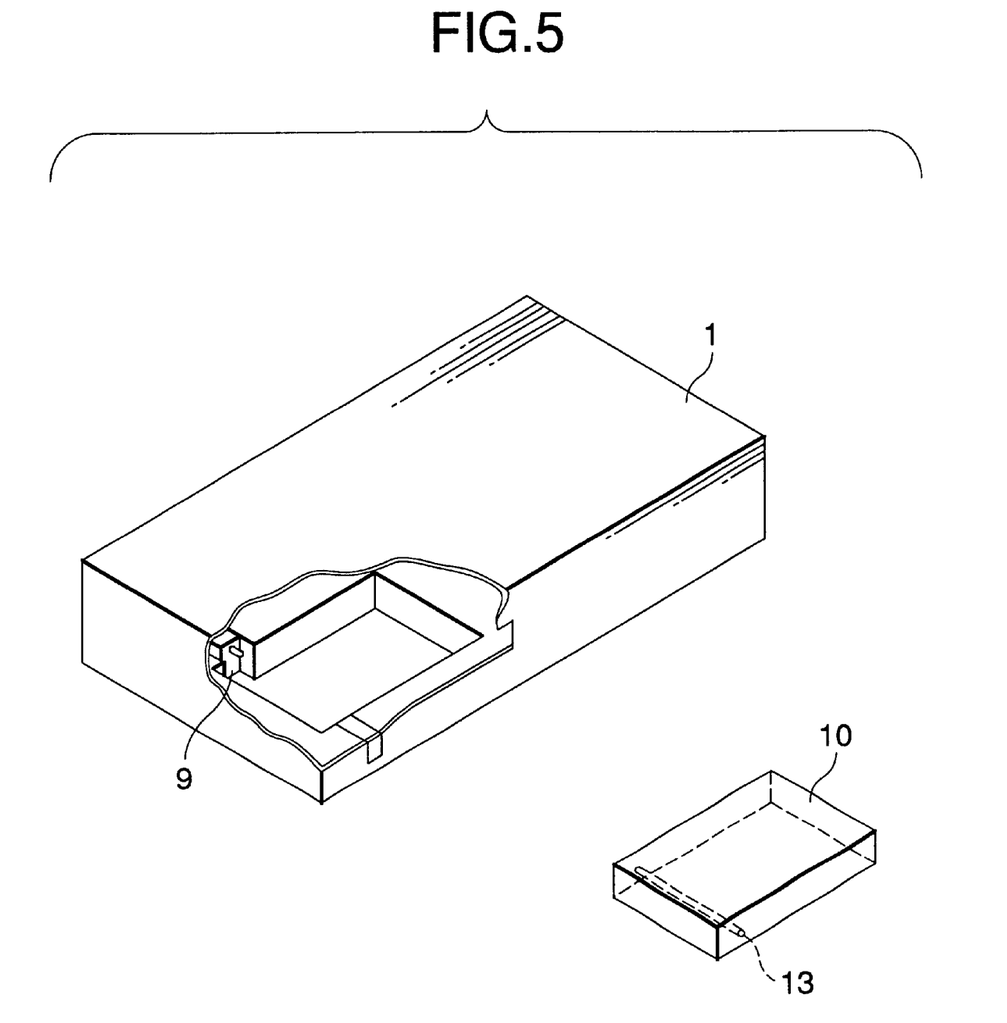
FIG. 5 is a perspective view showing the structure of an electronic equipment system according to the invention.

The above-described embodiment is structured so that when the loading device 10 is loaded in the electronic device 1, the light beam which the light emitting section 9 emits, according to a state of the hard disk device 11, is introduced in into the optical fiber. Thus, the embodiment can be detected from the state of light emission of the optical fiber 13 whether or not the hard disk device 11 is accessed or an error occurs within the latter 11. However, it may be modified as shown in FIG. 5. That is, when a loading device 10 including an electronic unit such as a video tape and a CD-ROM is loaded in the electronic device 1, the output light of the light emitting section 9 is applied to an optical fiber 13 arranged in the loading device 10. In this case, it can be detected from a state of light emission of the optical fiber 13 whether the loading device 10 is loaded therein or unloaded therefrom. In this connection, the electronic unit may be designed so as to have a loading mechanism such as cams and gears, or may have only an interface for the electronic device such as in the case of a video cassette.

Figure 6:
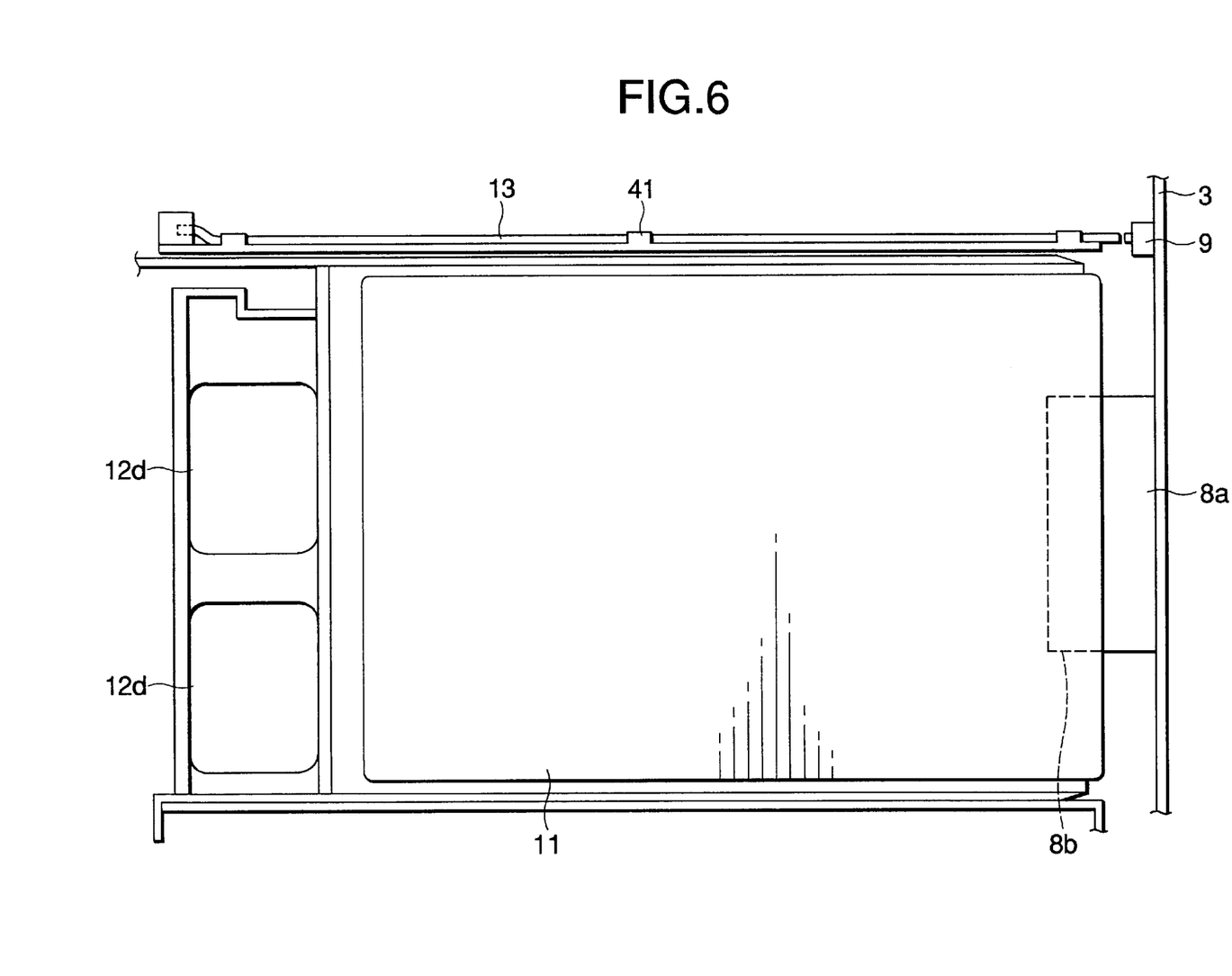
FIG. 6 is a sectional side view showing the structure of the tray of the loading device with an optical fiber arranged on the tray.

Furthermore, in the above-described embodiment, the optical fiber 13 is so arranged that it is buried in the tray accommodating section 12e formed in the tray 12. This feature is appreciable to the miniaturization of the device. In this connection, all that is necessary is that the optical fiber 13 is arranged in correspondence to the hard disk device 11. Therefore, as shown in FIG. 6, instead of the arrangement of the optical fiber within the tray 12, the optical fiber 13 may be mounted on an optical fiber mounting section 41. This modification has the same effects as the above-described embodiment.

EFFECT(S) OF THE INVENTION

According to an first aspect of the invention, the loading device is so designed that it has the optical fiber which transmits a light beam applied to one end thereof to the other end thereof. Hence, the output light of the light emitting device which is emitted according to a state of the electronic unit coupled to the loading device is displayed with the aid of the optical fiber. Therefore, in this case, when compared with the case where a display board is provided on the accommodating chassis, the space in the direction of height on the accommodating chassis is reduced; that is, the device can be made compact as much. In addition, the structure is simplified, and the manufacturing cost is decreased as much.

Further, the loading device may include the electronic unit including the loading mechanism or loading interface, and the optical fiber may be arranged in the electronic unit. Therefore, the space in the direction of height on the accommodating chassis is reduced; that is, the device can be made compact as much.

In addition, the loading device may have the unit accommodating section adapted to accommodate an electronic unit, and the optical fiber may be arranged in the unit accommodating section. Therefore, the space in the direction of height on the accommodating chassis is reduced; that is, the device can be made compact as much.

Further, when the device is loaded in an electronic device, the optical fiber may receive a light beam through one end thereof which is emitted inside the electronic device. Hence, the user can detect it from a state of light emission of the optical fiber whether or not the loading device is loaded in the electronic device.

In addition, when the loading device is loaded in an electronic device, the optical fiber may receive a light beam through one end thereof which the electronic device emits according to a state of the electronic device. Hence, the user can detect it from a state of light emission of the optical fiber whether or not the electronic unit is accessed or an error occurs with the latter.

Further, a lens may be provided at the other end face of the optical fiber through which the light beam applied thereto is emitted. In this case, the output light beam can be observed more clearly than in the case where it is observed at the end face of the optical fiber.

According to a second aspect of the invention, an electronic equipment system includes: the light emitting section which is provided in the electronic device in correspondence to the loading device; and the optical fiber which is provided in correspondence to the loading device and transmit output light beam of the light emitting section led through one end thereof to the other end thereof. Hence, the light beam of the light emitting section which is emitted according to a state of the electronic unit can be displayed with the aid of the optical fiber. Therefore, in this case, when compared with the case where a display board is provided on the accommodating chassis, the space in the direction of height on the accommodating chassis is reduced; that is, the device can be made compact as much. In addition, the structure is simplified, and the manufacturing cost is decreased as much.

In addition, the loading device may include an electronic unit having a loading mechanism or loading interface, and the optical fiber may be arranged in the electronic unit. Therefore, the space in the direction of height on the accommodating chassis is reduced; that is, the device can be made compact as much.

Further, the loading device may have the unit accommodating section adapted to accommodate the electronic unit, and the optical fiber may be arranged in the unit accommodating section. Therefore, the space in the direction of height on the accommodating chassis is reduced; that is, the device can be made compact as much.

Further, when the loading device is loaded in the electronic device, the optical fiber may receive through its one end face a light beam which is emitted in the electronic device. Therefore, the user can detect it from a state of light emission of the optical fiber whether or not the loading device has been loaded in the electronic device.

In addition, when the loading device is loaded in the electronic device, the optical fiber may receive through one end thereof a light beam which is emitted in the electronic device in correspondence to a state of the electronic unit. Therefore, the user can detect it from a state of light emission of the optical fiber whether or not the electronic unit is accessed or an error occurs with the latter.

Further, the lens may be provided at the other end of the optical fiber through which the light beam is emitted. In this case, the output light beam can be observed more clearly than in the case where it is observed at the end face of the optical fiber.

What is claimed is:

1. A loading device loadable into and unloadable from an electronic device, said loading device comprising:
   an electronic unit; and
   an optical fiber having first and second ends and a length extending between the first and second ends, said optical fiber being located entirely on said loading device for transmitting light received at the first end of said optical fiber to the second end of said optical fiber, the light being emitted within the electronic device based on an operating state of said electronic unit when said electronic unit is supplied with power, and when said loading device is loaded into the electronic device.

2. The loading device as claimed in claim 1, comprising a tray for accommodating said electronic unit, wherein said optical fiber is located on said tray.

3. The loading device as claimed in claim 1, including a lens located at the second end of said optical fiber through which the light passes.

4. The loading device as claimed in claim 1, wherein said optical fiber extends, in the loading device, in a loading direction of the loading device.

5. An electronic equipment system comprising:
   an electronic device;
   an electronic unit;
   a loading device into which said electronic device may be loaded and from which said electronic device may be unloaded;
   a light emitting section located in said electronic device in correspondence with said loading device, said light emitting section emitting light based on an operating state of said electronic unit when said electronic unit is supplied with power, and when said loading device is loaded into said electronic device; and
   an optical fiber having first and second ends and a length extending between the first and second ends, said optical fiber being located entirely on said loading device and transmitting the light from said light emitting section received at the first end of said optical fiber to the second end of said optical fiber when said loading device is loaded in said electronic device.

6. The electronic equipment as claimed in claim 5, wherein said loading device includes a tray accommodating said electronic unit, and said optical fiber is located on said tray.

7. The electronic equipment system as claimed in claim 5, including a lens located at the second end of said optical fiber through which the light passes.

8. The electronic equipment system as claimed in claim 5, wherein said optical fiber extends, in said loading device, in a loading direction of said loading device.

9. A loading device comprising:
   a tray having front and rear ends, said tray being loadable into and unloadable from an electronic device along a lengthwise direction of said tray, the lengthwise direction extending from the front end to the rear end;
   an electronic unit mounted on said tray and including an electrical connector for engaging a complementary electrical connector of the electronic device; and
   an optical fiber having first and second ends and a length extending between the first and second ends, said optical fiber being located entirely on said tray for transmitting light applied to the first end of said optical fiber by the electronic device to the second end of said optical fiber, said optical fiber extending on said tray from the rear end to the front end.

10. An electronic equipment system comprising:
    an electronic device including at least one electrical connector for connecting to a complementary connector of an electronic unit and a light emitting section including at least one light emitter for emitting light within said electronic device; and
    a loading device comprising:
      a tray having front and rear ends, said tray being loadable into and unloadable from said electronic device along a lengthwise direction of said tray, the lengthwise direction extending from the front end to the rear end;
      an electronic unit mounted on said tray and including an electrical connector for engaging a complementary electrical connector of said electronic device; and
      an optical fiber having first and second ends and a length extending between the first and second ends, said optical fiber being located entirely on said tray for transmitting light applied to the first end of said optical fiber by said light emitter of said electronic device to the second end of said optical fiber, said optical fiber extending on said tray from the rear end to the front end.

11. An electronic equipment system comprising:
    an electronic device;
    an electronic unit;
    a loading device into which said electronic device may be loaded and from which said electronic device may be unloaded;
    a light emitting section located in said electronic device in correspondence with said loading device, said light emitting section emitting light based on an operating state of said electronic unit when said electronic unit is supplied with power, and when said loading device is loaded into said electronic device; and an optical fiber having first and second ends and a length extending between the first and second ends, said optical fiber being located entirely on said electronic device and transmitting the light from said light emitting section received at the first end of said optical fiber to the second end of said optical fiber when said loading device is loaded in said electronic device.

12. An electronic equipment system comprising:

an electronic device including at least one electrical connector for connecting to a complementary connector of an electronic unit and a light emitting section including at least one light emitter for emitting light within said electronic device; and a loading device comprising:

a tray having front and rear ends, said tray being loadable into and unloadable from said electronic device along a lengthwise direction of said tray, the lengthwise direction extending from the front to the rear end;

an electronic unit mounted on said tray and including an electrical connector for engaging a complementary electrical connector of said electronic device; and an optical fiber having first and second ends and a length extending between the first and second ends, said optical fiber being located entirely on said electronic device for transmitting light applied to the first end of said optical fiber by said light emitter of said electronic device to the second end of said optical fiber when said loading device is loaded in said electronic device, said optical fiber extending on an optical fiber mounting section of said electronic device.

* * * * *